United States Patent [19]

Kubota et al.

[11] Patent Number: 5,620,665
[45] Date of Patent: Apr. 15, 1997

[54] METHOD OF RECYCLING UNSATURATED POLYESTER RESIN WASTE AND RECYCLING APPARATUS

[75] Inventors: Shizuo Kubota; Osamu Ito; Hiroyuki Miyamoto, all of Wakayama, Japan

[73] Assignee: Miyaso Chemical Co., Wakayama, Japan

[21] Appl. No.: 492,147

[22] Filed: Jun. 19, 1995

Related U.S. Application Data

[63] Continuation-in-part of Ser. No. 398,689, Mar. 6, 1995, Pat. No. 5,468,780.

[30] Foreign Application Priority Data

Jun. 21, 1994 [JP] Japan .................................. 6-138762
Dec. 20, 1994 [JP] Japan .................................. 6-316285
May 15, 1995 [JP] Japan .................................. 7-116111

[51] Int. Cl.$^6$ .............................. C08F 6/00; C08J 11/04
[52] U.S. Cl. ...................... 422/135; 422/131; 422/138; 521/48.5
[58] Field of Search ..................... 422/131, 132, 422/135, 137, 187, 234, 138; 521/48.5; 525/437, 438, 440; 528/80, 83, 85, 272, 275, 288, 302, 303, 308, 308.6

[56] References Cited

U.S. PATENT DOCUMENTS

| | | | |
|---|---|---|---|
| 3,105,896 | 10/1963 | Tolin et al. ........................ | 422/131 |
| 3,951,886 | 4/1976 | Miyake et al. ..................... | 521/48.5 |
| 4,269,776 | 5/1981 | Keunecke et al. .................. | 549/248 |
| 5,420,166 | 5/1995 | Tufts et al. ....................... | 521/40.5 |
| 5,468,780 | 11/1995 | Tufts et al. ....................... | 521/40.5 |

FOREIGN PATENT DOCUMENTS

| | | |
|---|---|---|
| 2413717 | 10/1974 | Germany . |
| 7-126430 | 5/1995 | Japan . |
| 1419049 | 12/1975 | United Kingdom . |
| WO94/25517 | 11/1994 | WIPO . |

OTHER PUBLICATIONS

Yoshio Kobayashi, Dai 42–Kai Kobunshikai–Daigaku Koen Yoshishu, p. 134 (1994).
Yoshihiro Fukuda, Kagaku to Kogyo (Osaka), 68 (2), 60 (1994).
Yoshinari Kobayashi, Kagaku to Kogyo (Osaka), 66 (10), 452 (1992).
Kazuhide Hamada, Jun Hosokawa and Masashi Nishiyama, Kobunshi Ronbunshu, 49, (8), 655 (1992).

Primary Examiner—Christopher Kim
Attorney, Agent, or Firm—Armstrong, Westerman Hattori, McLeland & Naughton

[57] ABSTRACT

Provided are a method which can recycle waste by chemically treating unsaturated polyester resin waste resulting from manufacturing of buttons or waste of fiber reinforced plastic products containing glass fiber, for example, and obtaining industrially useful raw material, and an apparatus for carrying out the method. Namely, unsaturated polyester resin waste is degraded with glycol, to obtain glycolic raw material. This degradation is preferably made under a pressure. It is possible to synthesize unsaturated polyester resin by reacting this glycolic raw material with unsaturated dibasic acid and saturated dibasic acid. It is also possible to synthesize polyurethane resin by reacting the glycolic raw material with a diisocyanate compound.

1 Claim, 2 Drawing Sheets

METHOD OF RECYCLING UNSATURATED POLYESTER RESIN WASTE AND RECYCLING APPARATUS

This application is a continuation-in-part of application Ser. No. 08/398,689, filed Mar. 6, 1995 U.S. Pat. No. 5,468,780.

BACKGROUND OF THE INVENTION

1. Field of the Invention

The present invention relates to a method of recycling unsaturated polyester resin waste and a recycling apparatus, and more particularly, it relates to a method of recycling unsaturated polyester resin waste by chemically treating the same and obtaining industrially valuable raw material, and an apparatus for carrying out the method.

2. Description of the Background Art

For example, most of buttons are made of unsaturated polyester resin. Such buttons are manufactured by punching out an unsaturated polyester resin sheet and cutting out the intermediate products as obtained. In the manufacturing steps, however, about 50% of the raw material is wasted as chippings and shavings. The problem of waste disposal also arises in relation to fiber reinforced plastic products such as FRP ships and bathtubs having matrices of unsaturated polyester resin. Thus, it is desirable to recycle such unsaturated polyester resin waste.

However, it is impossible to remelt and remold waste of the unsaturated polyester resin, which is thermosetting resin having a three-dimensional network structure, dissimilarly to that of thermoplastic resin such as polypropylene, for example. Further, the unsaturated polyester resin cannot be dissolved in a solvent.

To this end, there has been made study on a method of pulverizing fiber reinforced plastic (FRP) waste having a matrix of unsaturated polyester resin and recycling the same as a filler (Yoshihiro Fukuda, Kagaku to Kogyo (Osaka), 68 (2), 60 (1994)). However, the inventors have confirmed that this method encounters such a problem that the strength of the recycled resin, which is reduced as the amount of the waste powder is increased, entirely depends on the amount of new unsaturated polyester resin.

There has been made another study on a method of degrading the aforementioned FRP under a steam atmosphere at a temperature of 500° C. for obtaining components such as phthalic acid (Yoshinari Kobayashi, Kagaku to Kogyo (Osaka), 66 (10), 452 (1992); Kazuhide Hamada, Jun Hosokawa and Masashi Nishiyama, Kobunshi Ronbunshu, 49 (8), 655 (1992); Yoshio Kobayashi, Dai 42-Kai Kobunshi Kaki-Daigaku Koen Yoshishu, p. 134 (1994)). Further, a stem pyrolytic furnace for FRP has also been devised. However, the high temperature of 500° C. is necessary for thermally degrading the FRP, and hence this method inevitably requires a specific equipment. Further, glass fiber contained in the FRP is deteriorated due to the high temperature.

SUMMARY OF THE INVENTION

Accordingly, an object of the present invention is to provide a method of recycling unsaturated polyester resin waste by chemically treating the same and obtaining industrially valuable raw material with a simple equipment, i.e., a method of chemically recycling unsaturated polyester resin waste, and an apparatus for carrying out the method.

In order to solve the aforementioned technical problems, the inventive method of recycling unsaturated polyester resin waste comprises a step of degrading unsaturated polyester resin waste with glycol, thereby obtaining glycolic raw material.

Preferably, the degradation with glycol is carried out under a pressure.

The present invention is applicable to recycling of not only waste of the aforementioned resin employed for manufacturing buttons, but general unsaturated polyester resin waste. The unsaturated polyester resin to which the present invention is applied may contain a filler of calcium carbonate or the like, or may be composed with glass fiber or the like.

According to the present invention, the unsaturated polyester resin waste is preferably crushed and thereafter degraded with glycol, so that degradation of the waste with glycol is further facilitated. The waste can be crushed with a hammer or chain type impact crusher, a shear crusher, a cutting crusher, a roll, conveyor or screw type compression crusher, a stamp mill, a ball mill, a rod mill or the like. The grain size of the waste powder obtained by such crushing is preferably minimized, such that powder which is passed through a screen having meshes of 300 μm is advantageously employed, for example.

According to the present invention, glycol which is employed for the degradation with glycol is prepared from ethylene glycol, propylene glycol, diethylene glycol, dipropylene glycol, triethylene glycol, polyethylene glycol, tripropylene glycol, polypropylene glycol, neopentyl glycol, 1,3-butanediole, 1,6-hexanediole, bisphenol A hydride, bisphenol A propylene oxide adduct, dibromoneopentyl glycol or the like.

In the degradation with glycol, a catalyst is preferably employed. This catalyst is prepared from sodium methylate, sodium ethylate, sodium hydroxide, methanesulfonic acid, or metal acetate such as zinc acetate, magnesium acetate, calcium acetate, lithium acetate, sodium acetate, magnesium oxide, barium oxide, or calcium oxide, for example. However, it is possible to carry out the degradation with glycol without employing such a catalyst.

In the degradation with glycol, a temperature of about 150° to 250° is preferably supplied. The upper limit of the temperature range of about 250° C. is selected in relation to the boiling point of the glycol as employed, so that the glycol can maintain its liquid state. This upper limit temperature is preferably selected at a degree not substantially oxidizing the glycol.

When waste FRP is treated, the temperature which is supplied in the degradation with glycol will not deteriorate the glass fiber contained in the FRP, and hence the glass fiber can be recycled.

The degradation with glycol is preferably carried out under a nitrogen atmosphere, in order to prevent oxidation of the glycol or the like.

Such degradation of unsaturated polyester resin waste with glycol according to the present invention can be carried out by the following apparatus:

The apparatus for degrading unsaturated polyester resin waste according to the present invention comprises a reaction vessel, first injection means for injecting glycol into the reaction vessel, second injection means for injecting a catalyst into the reaction vessel, third injection means for injecting unsaturated polyester resin waste into the reaction vessel, heating means for heating the reaction vessel, cooling means for cooling the reaction vessel, a stirrer for stirring a reacted solution in the reaction vessel, a cooler for liquefying volatile components, including a subliming component, generated in the reaction vessel, a trap provided in a path connecting the reaction vessel with the cooler for removing the subliming component generated in the reaction vessel, and an outlet port provided in the reaction vessel for taking out a degradation liquid resulting from degradation reaction in the reaction vessel. The reaction vessel may be of e.g. stainless steel.

Preferably, the reaction vessel is closable.

The catalyst is prepared from sodium hydroxide, for example.

According to the present invention, further, the glycolic raw material obtained in the aforementioned manner can be effectively used as raw material for obtaining industrially useful resin. For example, it is possible to synthesize unsaturated polyester resin by reacting the glycolic raw material with dibasic acid, for example. Further, it is also possible to synthesize polyurethane resin by reacting the glycolic raw material with a diisocyanate compound.

The pre-synthesis of the unsaturated polyester resin or the polyurethane resin from the glycolic raw material is preferably carried out under a nitrogen atmosphere, in order to prevent oxidation of the glycol.

The dibasic acid employed for synthesizing the unsaturated polyester resin includes unsaturated dibasic acid and saturated dibasic acid, both of which are employed in general. Examples of the unsaturated dibasic acid are maleic anhydride, fumaric acid and itaconic acid. Examples of the saturated dibasic acid are phthalic anhydride, isophthalic acid, terephthalic acid, tetrahydrophthalic anhydride, methyltetrahydrophthalic anhydride, endomethylenetetrahydrophthalic anhydride, adipic acid, sebacic acid, chlorendic acid (1,4,5,6,7,7-hexachlorobicylo [2,2,1]-5-heptene-2,3-dicarboxylic acid), and tetrabromophthalic anhydride. The terephthalic acid can be prepared from that discharged through alkali reduction of polyester fiber.

The unsaturated polyester resin can be synthesized by an ordinary method of setting a reaction temperature of 140° C. to 230° C., condensing the material for 2 to 6 hours while distilling water away under nitrogen, cooling the reactant, thereafter introducing 30 to 40% of styrene therein, and adding 0.02 part of hydroquinone for serving as a polymerization inhibiter.

On the other hand, the diisocyanate compound which is reacted with the glycolic raw material for synthesizing polyurethane resin is prepared from toluene diisocyanate, diphenylmethane diisocyanate (MDI), naphthalene diisocyanate, tolidine diisocyanate, hexamethylene diisocyanate, isophorone diisocyanate, p-phenylene diisocyanate, transcyclohexane 1,4-diisocyanate, xylylene diisocyanate (XDI), hydrogeneration XDI, hydrogeneration MDI, lysine diisocyanate, or tetramethylxylene diisocyanate. The polyurethane resin can be synthesized by an ordinary method.

The unsaturated polyester resin or the polyurethane resin recycled in the aforementioned manner can be employed as a molding material, an adhesive or a paint. Such resin is molded by an ordinary molding method such as hand lay up molding, compression molding, cast molding, injection molding, reaction injection molding, transfer molding or the like.

The aforementioned degradation and re-synthesis of unsaturated polyester resin waste according to the present invention can be carried out by the following apparatus:

A recycling apparatus for unsaturated polyester resin waste according to the present invention comprises a reaction vessel, first injection means for injecting glycol into the reaction vessel, second injection means for injecting a catalyst into the reaction vessel, third injection means for injecting unsaturated polyester resin waste into the reaction vessel, heating means for heating the reaction vessel, cooling means for cooling the reaction vessel, a stirrer for stirring a reacted solution in the reaction vessel, a cooler for liquefying volatile components, including a subliming component, generated in the reaction vessel, a trap provided in a path connecting the reaction vessel with the cooler for removing the subliming component generated from the reaction vessel, an outlet port provided in the reaction vessel for taking out a degradation liquid resulting from degradation reaction in the reaction vessel, a centrifugal separator for centrifuging the degradation liquid taken out from the outlet port, fourth injection means for re-injecting the degradation liquid, which is subjected to removal of precipitates by centrifugation through the centrifugal separator, into the reaction vessel for re-synthesis reaction, fifth injection means for injecting maleic anhydride into the reaction vessel, sixth injection means for injecting phthalic anhydride into the reaction vessel, seventh injection means for injecting styrene into the reaction vessel, and a nitrogen inlet tube for introducing nitrogen gas into the reaction vessel which is under re-synthesis reaction, for re-synthesizing recycled unsaturated polyester resin in the reaction vessel while carrying out heating by the heating means and stirring by the stirrer. The reaction vessel may be of e.g. stainless steel.

Preferably, the reaction vessel is closable.

The catalyst is prepared from sodium hydroxide, for example.

According to the present invention, it is possible to obtain industrially useful glycolic raw material from the unsaturated polyester resin waste. The degradation with glycol for obtaining such glycolic raw material can be carried out at a relatively low temperature through a relatively simple operation, whereby the unsaturated polyester resin waste can be recycled with a relatively simple equipment.

According to the present invention, the degradation rate can be prompted by carrying out the degradation with glycol under a high temperature and a pressure. Namely, the reaction can be made with glycol having a low boiling point at a temperature exceeding the boiling point, by carrying out the reaction under a pressure. The price of the glycol is reduced as the boiling point is reduced, and hence such reaction under a pressure is effective for reducing the cost. Also in consideration of prevention of oxidation, the reaction vessel is preferably closed for carrying out the reaction under a pressure.

Each of the degradation apparatus and the recycling apparatus for unsaturated polyester resin waste according to the present invention comprises a reaction vessel of stainless. This reaction vessel of stainless is superior in resistance against alkali and can be used at a higher temperature, as compared with that of glass. Further, the reaction vessel of stainless has a high torque of stirring, whereby the ratio of the unsaturated polyester resin waste to the glycol can be increased.

In addition, each of the degradation apparatus and the recycling apparatus for unsaturated polyester resin waste according to the present invention can be used under a pressure if the reaction vessel is closable. When the apparatus is used under a pressure, degradation is effectively prompted since treatment is enabled at a temperature exceeding the boiling point of the glycol as employed.

The foregoing and other objects, features, aspects and advantages of the present invention will become more

DESCRIPTION OF THE PREFERRED EMBODIMENTS

Figure 1:
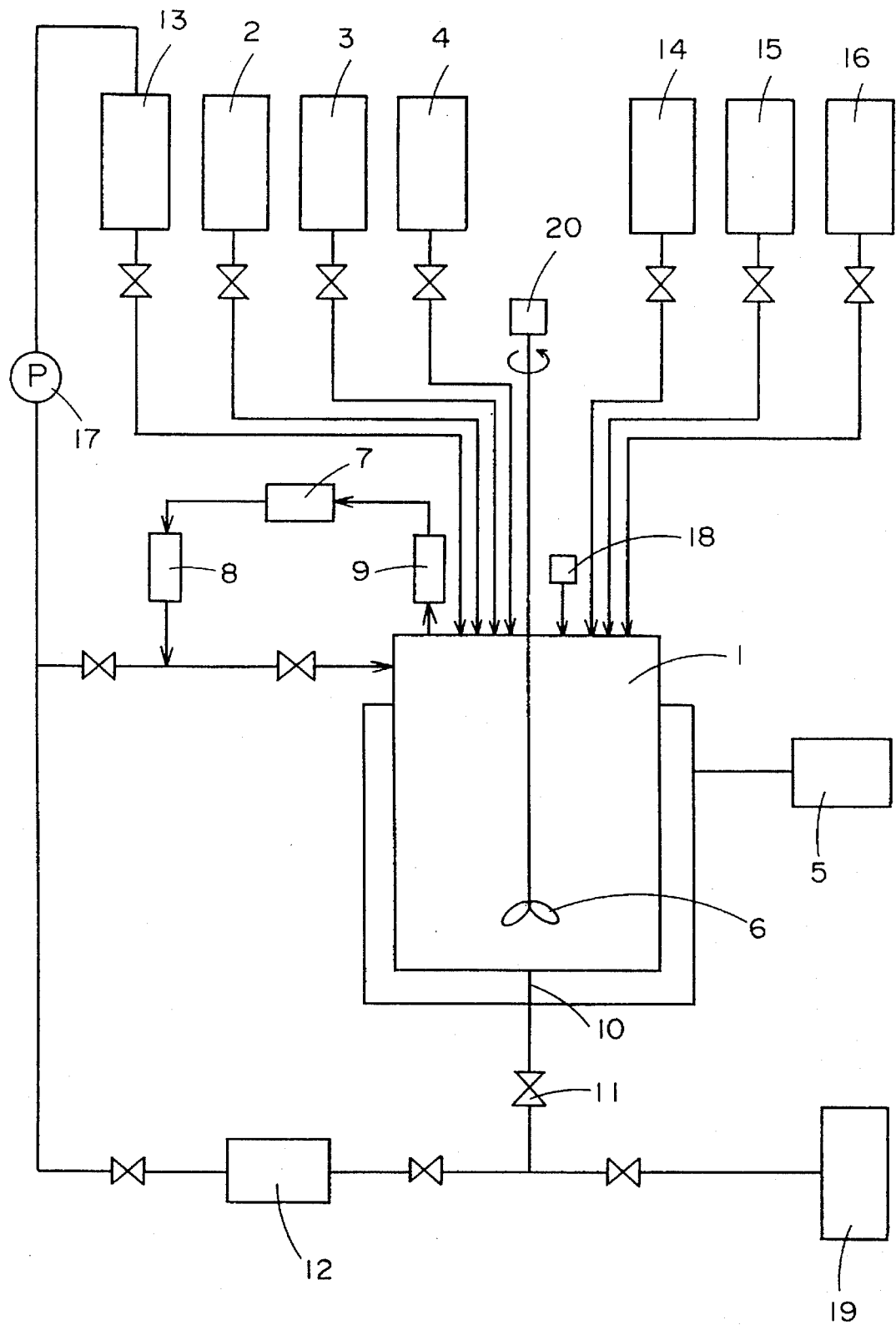
FIG. 1 schematically illustrates the structure of an exemplary recycling apparatus for unsaturated polyester resin waste according to the present invention.

The present invention is now described in more concrete terms with reference to Examples.

(A) Examples Under Normal Pressure

In the following Examples 1 to 16, chippings of buttons consisting of unsaturated polyester resin were crushed by a crusher MIYAKO DM-6 (by Miyako Product Co., Inc., rotational frequency: 28,000/min., capacity: 150 g), and the powder materials as obtained were passed through screens having meshes of 300 μm for preparing samples.

(EXAMPLE 1) Degradation with Glycol by EtONa Catalyst 10 g of unsaturated polyester resin waste, 100 g of ethylene glycol, and 2 g of EtONa were introduced into a 1L three-necked round bottom flask provided with a stirrer and a cooler, and treated at 180° C. for 5 hours and then at 200° C. for 8 hours respectively. The reactant obtained by such treatment was filtered, washed with tetrahydrofuran (THF), and dried. 4.5636 g of remainder resin was filtered out, with a degradation rate of 54.4%. A THF solution was prepared from the degradation product, the molecular weight of which was measured through gel permeation chromatography (GPC) with reference to standard polystyrene, to observe values of number-average molecular weight and (weight-average molecular weight)/(number-average molecular weight) of 138 and 1.05 respectively.

(EXAMPLE 2) Degradation with Glycol by $CH_3SO_3H$ Catalyst 10 g of unsaturated polyester resin waste, 100 g of ethylene glycol, and 2 g of methanesulfonic acid were introduced into a round bottom flask which was similar to that employed in Example 1, and treated at 180° C. for 5 hours and then at 200° C. for 8 hours respectively. The reactant obtained by such treatment was filtered, washed with THF, and dried. 6.6807 g of remainder resin was filtered out, with a degradation rate of 33.2%. The degradation product was subjected to measurement of the molecular weight similarly to Example 1, to exhibit values of number-average molecular weight and (weight-average molecular weight)/(number-average molecular weight) of 186 and 1.06 respectively.

(EXAMPLE 3) Degradation with Glycol by MeONa Catalyst 20 g of unsaturated polyester resin waste, 40 g of ethylene glycol, 2 g of sodium methylate, and 50 ml of dimethylformamide (DMF) were introduced into a round bottom flask which was similar to that employed in Example 1 and treated at 150° C. for 5 hours, the DMF was distilled away, and thereafter the mixture was further treated at 200° C. for 8 hours. The reactant obtained by such treatment was filtered, washed with THF, and dried. 10.2216 g of remainder resin was filtered out, with a degradation rate of 48.89%.

(EXAMPLE 4) Degradation with Glycol by No Catalyst 10 g of unsaturated polyester resin waste and 100 g of ethylene glycol were introduced into a round bottom flask which was similar to that employed in Example 1, and treated at 200° C. for 13 hours. The reactant obtained by such treatment was filtered, washed with THF, and dried. 6.0431 g of remainder resin was filtered, with a degradation rate of 39.57%.

(EXAMPLE 5) Degradation with Glycol under Relatively Low Temperature 10 g of unsaturated polyester resin waste, 20 g of ethylene glycol, 100 ml of THF, and 1 g of EtONa were introduced into a round bottom flask which was similar to that employed in Example 1, and treated at 70° C. for 13 hours. The reactant obtained by such treatment was filtered, washed with THF, and dried. 9.7670 g of remainder resin was filtered out, with a degradation rate of 2.3%.

(EXAMPLE 6) Degradation with Glycol by NaOH Catalyst 10 g of unsaturated polyester resin waste, 40 g of ethylene glycol, and 2 g of sodium hydroxide were introduced into a round bottom flask which was similar to that employed in Example 1, and treated at 200° C. for 9 hours. The reactant obtained by such treatment was filtered, washed with THF, and dried. 4.2357 g of remainder resin was filtered out, with a degradation rate of 57.64%.

(EXAMPLE 7) Degradation with Glycol by NaOH Catalyst 100 g of unsaturated polyester resin waste, 120 g of ethylene glycol, and 1 g of sodium hydroxide were introduced into a round bottom flask which was similar to that employed in Example 1, and treated at 200° C. for 24 hours. The reactant obtained by such treatment was filtered, washed with THF, and dried. 46.0 g of remainder resin was filtered out, with a degradation rate of 54.0%.

Further, 2 g of sodium hydroxide, 2 g of sodium ethylate and 250 g of diethylene glycol were added to 46.0 g of the remainder resin, and the mixture was introduced into a round bottom flask similarly to the above, to be treated at 245° C. for 8.5 hours. Then, the reactant as obtained was filtered similarly to the above, washed with THF, and dried. 0.8 g of remainder resin was filtered out, with a degradation rate of 98.3%.

(EXAMPLE 8) Degradation of FRP Waste with Glycol 100 g of FRP waste, 150 g of ethylene glycol, and 1 g of sodium hydroxide were introduced into a round bottom flask which was similar to that employed in Example 1, treated at 200° C. for 14 hours. The reactant obtained by such treatment was filtered, washed with THF, and dried. 76.52 g of remainder resin was filtered out, with a degradation rate of 23.43%.

(EXAMPLE 9) Degradation with Glycol by Zinc Acetate Catalyst 10 g of unsaturated polyester resin waste, 40 g of ethylene glycol, and 0.5 g of zinc acetate were introduced into a round bottom flask which was similar to that employed in Example 1, and treated at 200° C. for 7 hours. The reactant obtained by Such treatment was filtered, washed with THF, and dried. 5.8665 g of remainder resin was filtered out, with a degradation rate of 41.34%.

(EXAMPLE 10) Degradation with Glycol by Propylene Glycol 10 g of unsaturated polyester resin waste, 40 g of propylene glycol, and 2 g of sodium methylate were introduced into a round bottom flask which was similar to that employed in Example 1, and treated at 200° C. for 9 hours. The reactant obtained by such treatment was filtered, washed with THF, and dried. 7.6956 g of remainder resin was filtered out, with a degradation rate of 23.04%. Values of number-average molecular weight and (weight-average molecular weight)/(number-average molecular weight) obtained through GPC were 293 and 1.03 respectively.

(EXAMPLE 11) Degradation with Glycol by Propylene Glycol 20 g of unsaturated polyester resin waste, 40 g of propylene glycol, and 2 g of sodium ethylate were introduced into a round bottom flask which was similar to that employed in Example 1, and treated at 190° C. for 10 hours. The reactant obtained by such treatment was filtered, washed with THF, and dried. 15.3695 g of remainder resin was filtered out, with a degradation rate of 23.15%.

(EXAMPLE 12) Synthesis of Recycled Unsaturated Polyester Resin

The ethylene glycol degradation product (degradation product of 9.7784 g in ethylene glycol of 40 g; 0.644 mol) obtained in Example 3 was neutralized with hydrochloric acid, 74.8 g (0.644 mol) of maleic acid was added thereto, water was distilled away under nitrogen, and the mixture was reacted at 210° C. for 2 hours, to obtain 92.1 g of recycled unsaturated polyester resin. Through GPC, the resin as obtained exhibited values of number-average molecular weight and (weight-average molecular weight)/(number-average molecular weight) of 1,121 and 1.38 respectively.

(EXAMPLE 13) Synthesis of Recycled Unsaturated Polyester Resin

The propylene glycol degradation product (degradation product of 4.6305 g in propylene glycol of 40 g; 0.525 mol) obtained in Example 11 was neutralized with hydrochloric acid, and 20.6 g (0.210 mol) of maleic acid and 46.7 g (0.315 mol) of phthalic anhydride were added thereto, water was distilled away under nitrogen, and the mixture was reacted at 210° C. for 4 hours, to obtain 68.9 g of recycled unsaturated polyester resin. Through GPC, the resin as obtained exhibited values of number-average molecular weight and (weight-average molecular weight)/(number-average molecular weight) of 1,508 and 2.01 respectively. For the purpose of comparison, it is pointed out that "Polylite 210M" by Dainippon Ink and Chemicals, Inc. has values of number-average molecular weight and (weight-average molecular weight)/(number-average molecular weight) of 1,646 and 3.26 respectively.

45.9 g of styrene was added to 68.9 g of the unsaturated polyester resin obtained in the aforementioned manner, with addition of 1% each of methyl ethyl ketone peroxide and cobalt naphthenate with respect to the total weight of the unsaturated polyester resin and the styrene to obtain a resin composition, which in turn was cast-molded under conditions of precuring at 25° C. for 2 hours and postcuring at 70° C. for 2 hours. The molding as obtained exhibited bending strength of 132.2 MPa, while a molding of the aforementioned "Polylite 210M" exhibited bending strength of 92.1 MPa.

(EXAMPLE 14) Synthesis of Recycled Unsaturated polyester Resin

The propylene glycol degradation product (degradation product of 4.6305 g in propylene glycol of 40 g; 0.525 mol) obtained in Example 11 were neutralized with hydrochloric acid, 20.6 g (0.210 mol) of maleic anhydride and 52.3 g (0.315 mol) of terephthalic acid discharged in reduction of polyester fiber were added thereto, water was distilled away under nitrogen, and the mixture was reacted under 210° C. for 4 hours, to obtain 69.5 g of recycled unsaturated polyester resin. Through GPC, values of number-average molecular weight and (weight-average molecular weight)/(number-average molecular weight) of the resin as obtained were 1,500 and 2.00 respectively.

(EXAMPLE 15) Recycling of Glass Fiber 50 g of unsaturated polyester resin "Polylite BS210M" by Dainippon Ink and Chemicals, Inc., containing 30 to 40% of styrene, was prepared with addition of 1% each of methyl ethyl ketone peroxide and cobalt naphthanate with respect to the weight of the "Polylite BS210M" and 15 g of the glass fiber recovered in Example 8, to obtain a composite resin composition. This composite resin composition was cast-molded under conditions of precuring at 25° C. for 2 hours and postcuring at 70° C. for 2 hours. The molding as obtained exhibited bending strength of 140 MPa. For the purpose of comparison, it is pointed out that a mixture prepared in the aforementioned manner with no addition of the glass fiber and a commercially available FRP tank containing 30% of glass fiber exhibited bending strength values of 92.1 MPa and 134 MPa respectively.

(EXAMPLE 16) Synthesis of Recycled Polyurethane Resin 50 g of the ethylene glycol degradation product obtained in Example 3 was neutralized with hydrochloric acid, and 0.05 g of triethylenediamine and 0.15 g of tin octenate (II) were added to and mixed with the same. 25 g of toluene diisocyanate was added to and further mixed with this mixture, which in turn was reacted at 100° C. for 1 hour, to obtain polyurethane resin.

(B) Examples on Degradation Under Pressure

In the following Examples 17 to 25 and comparative examples 1 and 2, chippings of buttons consisting of unsaturated polyester resin were crushed into 3 mm in grain size by a rotary cutter mill "Granulaters U-140" (by HORAI CO., LTD.) and further into 100 meshes by a high-speed hammer mill (by Yoshida Seisakusho Co., Ltd.), for preparing samples.

On the other hand, shavings of the buttons were employed for degradation with glycol as such.

Comparative examples 1 and 2 are thus named in comparison with Examples of degradation under pressures, although the same are inventive examples.

(EXAMPLE 17) Degradation with NaOH Catalyst under Pressure 2 g of unsaturated polyester resin waste (chippings), 20 g of ethylene glycol, and 0.2 g of sodium hydroxide were introduced into a vessel of Portable reactor TVS-N2 (cap bolt system) (by Taiatsu Corporation), and treated at 250° C. for 5 hours. The reactant obtained by such treatment was filtered, washed with water and THF, and dried. 0.7683 g of remainder resin was obtained after the drying, with a degradation rate of 61.6%.

The molecular weight of the degradation product was measured through GPC similarly to Example 1. In result, number-average molecular weight and (weight-average molecular weight)/(number-average molecular weight) were 269 and 1.24 respectively at a peak 1 of the degradation product. At a peak 2 of the degradation product, on the other hand, number-average molecular weight and (weight-average molecular weight)/(number-average molecular weight) were 229 and 1.01 respectively. At a peak 3 of the degradation product, further, number-average molecular weight and (weight-average molecular weight)/(number-average molecular weight) were 141 and 1.03 respectively. At the total peak of the degradation product, number-average molecular weight and (weight-average molecular weight)/(number-average molecular weight) were 182 and 1.39 respectively.

(EXAMPLE 18) Degradation with NaOH Catalyst under Pressure 2 g of unsaturated polyester resin waste (chippings), 20 g of ethylene glycol, and 0.2 g of sodium hydroxide were introduced into a vessel which was similar to that of Example 17, and treated at 270° C. for 3 hours. The reactant obtained by such treatment was filtered, washed with water and THF, and dried. 0.7579 g of remainder resin was obtained after the drying, with a degradation rate of 62.10%.

(EXAMPLE 19) Degradation with NaOH Catalyst under Pressure 2 g of unsaturated polyester resin waste (chippings), 20 g of ethylene glycol, and 0.2 g of sodium hydroxide were introduced into a vessel which was similar to that of Example 17, and treated at 280° C. for 3 hours. The reactant obtained by such treatment was filtered, washed with water and THF, and dried. 0.7213 g of remainder resin was obtained after the drying, with a degradation rate of 63.94%.

(EXAMPLE 20) Degradation with NaOH Catalyst under Pressure 2 g of unsaturated polyester resin waste (chippings), 20 g of ethylene glycol, and 0.2 g of sodium hydroxide were introduced into a vessel which was similar to that of Example 17, and treated at 290° C. for 3 hours. The reactant obtained by such treatment was filtered, washed with water and THF, and dried. 0.4891 g of remainder resin was obtained after the drying, with a degradation rate of 75.55%.

The molecular weight of the degradation product was measured through GPC similarly to Example 1. In result, number-average molecular weight and (weight-average molecular weight)/(number-average molecular weight) were 235 and 1.01 respectively at a peak 1 of the degradation product. At a peak 2 of the degradation product, number-average molecular weight and (weight-average molecular weight)/(number-average molecular weight) were 156 and 1.02 respectively. At the total peak of the degradation product, number-average molecular weight and (weight-average molecular weight)/(number-average molecular weight) were 156 and 1.06 respectively.

(Comparative Example 1) Degradation with NaOH Catalyst Under Atmosphere 10 g of unsaturated polyester resin waste (chippings), 40 g of ethylene glycol, and 2 g of sodium hydroxide were introduced into a 1L three-necked round bottom flask provided with a stirrer and a cooler which was similar to that of Example 1, and treated at 200° C. for 9 hours. The reactant obtained by such treatment was filtered, washed with THF, and dried. 4.2357 g of remainder resin was filtered out, with a degradation rate of 47.64%.

(EXAMPLE 21) Degradation of FRP with NaOH Catalyst under Pressure 2 g of FRP waste, 20 g of ethylene glycol, and 0.2 g of sodium hydroxide were introduced into a vessel which was similar to that of Example 17, and treated at 290° C. for 7 hours. The reactant obtained by such treatment was filtered, washed with water and THF, and dried. 0.7055 g of remainder resin was obtained after the drying including glass fiber, with a degradation rate of 64.73% with respect to the waste FRP.

The molecular weight of the degradation product was measured through GPC similarly to Example 1. In result, number-average molecular weight and (weight-average molecular weight)/(number-average molecular weight) were 243 and 1.05 respectively at a peak 1 of the degradation product. At a peak 2 of the degradation product, number-average molecular weight and (weight-average molecular weight)/(number-average molecular weight) were 131 and 1.01 respectively. At the total peak of the degradation product, number-average molecular weight and (weight-average molecular weight)/(number-average molecular weight) were 190 and 1.13 respectively.

(Comparative Example 2) Degradation of FRP with NaOH Catalyst Under Atmosphere 100 g of FRP waste, 150 g of ethylene glycol, and 1 g of sodium hydroxide were introduced into a 1L three-necked round bottom flask provided with a stirrer and a cooler which was similar to that of Example 1, and treated at 200° C. for 14 hours. The reactant obtained by such treatment was filtered, washed with THF, and dried. 76.52 g of remainder resin was filtered out, with a degradation rate of 23.43%.

(EXAMPLE 22) Degradation with MgO Catalyst under Pressure 2 g of unsaturated polyester resin waste (chippings), 20 g of ethylene glycol, and 0.2 g of magnesium hydroxide were introduced into a vessel which was similar to that of Example 17, and treated at 250° C. for 5 hours. The reactant obtained by such treatment was filtered, washed with diluted hydrochloric acid and THF, and dried. 0.8458 g of remainder resin was obtained after the drying, with a degradation rate of 57.71%.

(EXAMPLE 23) Degradation with BaO Catalyst under Pressure 2 g of unsaturated polyester resin waste (chippings), 20 g of ethylene glycol, and 0.2 g of barium oxide were introduced into a vessel which was similar to that of Example 17, and treated at 250° C. for 5 hours. The reactant obtained by such treatment was filtered, washed with diluted hydrochloric acid and THF, and dried. 0.8967 g of remainder resin was obtained after the drying, with a degradation rate of 55.17%.

(EXAMPLE 24) Degradation with CaO Catalyst under Pressure 2 g of unsaturated polyester resin waste (chippings), 20 g of ethylene glycol, and 0.2 g of calcium oxide were introduced into a vessel which was similar to that of Example 17, and treated at 250° C. for 5 hours. The reactant obtained by such treatment was filtered, washed with diluted hydrochloric acid and THF, and dried. 0.8924 g of remainder resin was obtained after the drying, with a degradation rate of 55.38%.

(EXAMPLE 25) Degradation with Zinc Acetate Catalyst under Pressure 2 g of unsaturated polyester resin waste (chippings), 20 g of ethylene glycol, and 0.2 g of zinc acetate were introduced into a vessel which was similar to that of Example 17, and treated at 250° C. for 5 hours. The reactant obtained by such treatment was filtered, washed with diluted hydrochloric acid and THF, and dried. 0.9600 g of remainder resin was obtained after the drying, with a degradation rate of 51.97%.

(C) Examples Employing Apparatus of Stainless

FIG. 1 schematically illustrates the structure of an exemplary recycling apparatus for unsaturated polyester resin waste according to the present invention.

Referring to FIG. 1, this apparatus comprises a stainless 100L reaction vessel 1 which is closable, a first tank 2 storing glycol to be injected into the reaction vessel 1, a second tank 3 storing sodium hydroxide to be injected into the reaction vessel 1, and a third tank 4 for storing unsaturated polyester resin waste to be injected into the reaction vessel 1.

The reaction vessel 1 is provided with a heating and cooling medium boiler 5 for heating the reaction vessel 1, and a stirrer 6 which is rotated by a motor 20 for stirring a reacted solution in the reaction vessel 1.

The reaction vessel 1 is further provided with a cooler 7 for liquefying volatile components which are generated in the reaction vessel 1, and a receiver 8 for receiving the liquid resulting from such liquefaction by the cooler 7.

Figure 2:
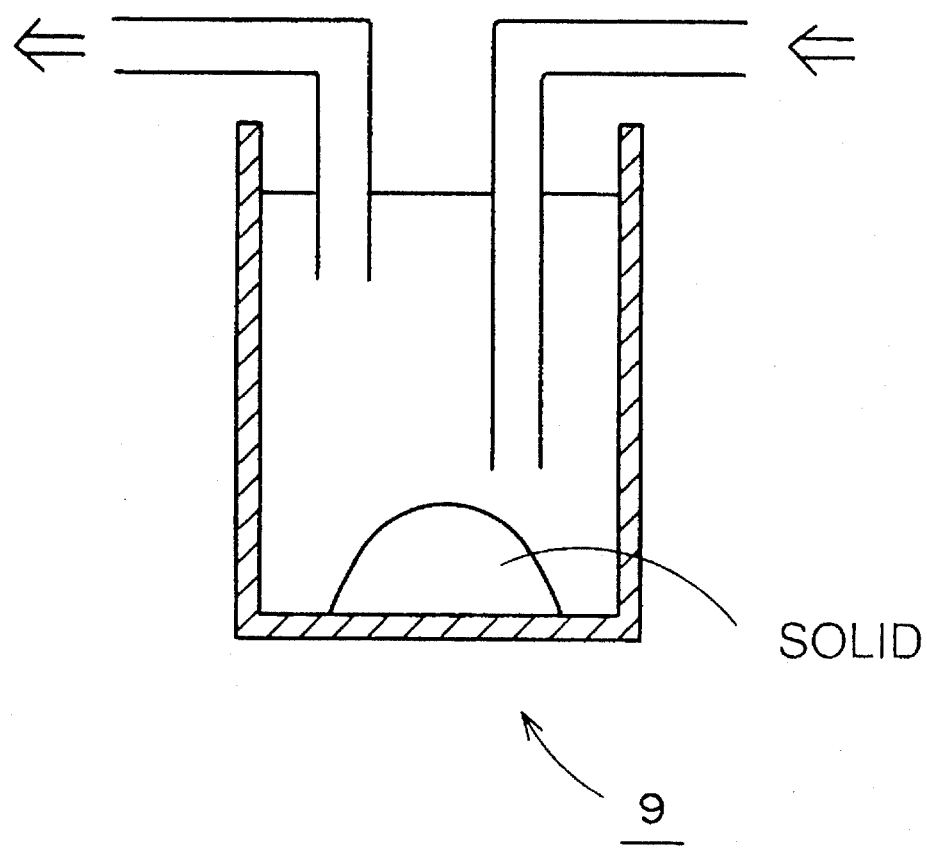
FIG. 2 is adapted to illustrate a trap provided in the apparatus shown in FIG. 1.

The volatile components generated in the reaction vessel 1 include a sublimable component such as phthalic acid, which may be solidified to block a tube portion of the cooler 7 when the same is directly fed into the cooler 7. In this apparatus, therefore, a trap 9 is provided in a path connecting the reaction vessel 1 with the cooler 7. This trap 9 is structured as shown in FIG. 2, for removing the sublimable component such as phthalic acid.

The reaction vessel 1 is further provided with an outlet port 10 for taking out a degradation liquid resulting from degradation reaction in the reaction vessel 1.

This apparatus further comprises a centrifugal separator 12 for removing an unreactant and a filler such as glass fiber from the degradation liquid which is taken out from the outlet port 10.

In addition, this apparatus further comprises a fourth tank 13 storing the degradation liquid, which is subjected to removal of precipitates by centrifugation, for injecting the same into the reaction vessel 1 again for making re-synthesis reaction, a fifth tank 14 storing maleic anhydride to be injected into the reaction vessel 1, a sixth tank 15 storing phthalic anhydride to be injected into the reaction vessel 1, a seventh tank 16 storing styrene to be injected into the reaction vessel 1, and a nitrogen inlet tube 18 for introducing nitrogen gas into the reaction vessel 1 which is under re-synthesis reaction.

Through the recycling apparatus having the aforementioned structure, degradation and re-synthesis reaction of unsaturated polyester resin waste are carried out as follows:

First, glycol is injected into the reaction vessel 1 from the first tank 2, and thereafter cooling water is fed to drive the cooler 7. Volatile components which are generated during reaction are liquefied by the cooler 7, and collected in the receiver 8. The liquid collected in the receiver 8 is properly returned into the reaction vessel 1. A sublimable component such as phthalic acid is removed by the trap 9 before the same reaches the cooler 7.

Then, the stirrer 6 is rotated by the motor 20, to start stirring the solution contained in the reaction vessel 1. Then, sodium hydroxide for serving as a catalyst is injected into the reaction vessel 1 from the second tank 3, and thereafter the reaction vessel 1 is heated by the heating medium boiler 5. Then, unsaturated polyester resin waste is introduced into the reaction vessel 1 from the third tank 4, to make degradation reaction.

After completion of the degradation reaction, the heating medium boiler 5 is switched to cooling, for cooling the reaction vessel 1 to a prescribed temperature. Then, a valve 11 is opened to take out the degradation liquid from the reaction vessel 1 through the outlet port 10. The degradation liquid as taken out is centrifuged by the centrifugal separator 12 for removal of precipitates, and thereafter fed to the fourth tank 13 by a pump 17.

The degradation liquid resulting from the aforementioned degradation reaction is again injected into the reaction vessel 1, for re-synthesis reaction.

Then, maleic anhydride is injected into the reaction vessel 1 from the fifth tank 14, and phthalic anhydride is further injected from the sixth tank 15. Then, the reaction vessel 1 is heated by the heating medium boiler 5, to make re-synthesis reaction. In the re-synthesis reaction, nitrogen gas is introduced into the reaction vessel 1 through the nitrogen inlet tube 18, so that the reacted solution is stirred by the stirrer 6.

After reaction, the reaction vessel 1 is cooled and styrene is injected into the same from the seventh tank 16, to obtain recycled unsaturated polyester resin. This recycled resin is stored in a tank 19.

Description is now made on Examples of degradation and re-synthesis carried out through this apparatus.

In the following Examples 26 to 30, chippings of buttons consisting of unsaturated polyester resin were crushed into 3 mm in grain size by a rotary cutter mill "Granulaters U-140" (by HORAI CO., LTD.) and further into 100 meshes by a high-speed hammer mill (by Yoshida Seisakusho Co., Ltd.) for preparing samples.

On the other hand, shavings of the buttons were employed for degradation with glycol as such.

(EXAMPLE 26) Degradation with Ethylene Glycol in Apparatus of Stainless 40 kg of ethylene glycol was introduced into the stainless 100L reaction vessel 1 from the chemical injection tank 2, and cooling water was fed to drive the cooler 7 while the stirrer 6 was rotated to start stirring at 24 rpm.

Then, 800 g of sodium hydroxide was introduced into the reaction vessel 1 from the chemical injection tank 3, and the temperature was increased by the heating medium boiler 5. Then, 20 kg of unsaturated polyester button shavings were introduced into the reaction vessel 1 from the tank 4.

After the temperature was raised up to 197° C., treatment was made for 4 hours and 40 minutes. After reaction, the heating medium boiler 5 was switched to cooling for cooling the reaction vessel 1 to 150° C., and thereafter the valve 11 provided on the lower portion of the reaction vessel 1 was opened to remove undegraded materials by the centrifugal separator 12. A degradation liquid of 43.45 kg was obtained, with a degradation rate of 17.25%.

The molecular weight of the degradation product was measured through GPC similarly to Example 1. In result, number-average molecular weight and (weight-average molecular weight)/(number-average molecular weight) were 247 and 1.05 respectively at a peak 1 of the degradation product. At a peak 2 of the degradation product, number-average molecular weight and (weight-average molecular weight)/(number-average molecular weight) were 147 and 1.03 respectively. At the total peak of the degradation product, number-average molecular weight and (weight-average molecular weight)/(number-average molecular weight) were 201 and 1.12 respectively.

(EXAMPLE 27) Degradation with Diethylene Glycol in Apparatus of Stainless 50 kg of diethylene glycol was introduced into the stainless 100L reaction vessel 1 from the chemical injection tank 2, and cooling water was fed to drive the cooler 7 while the stirrer 6 was rotated to start stirring at 24 rpm.

Then, 800 g of sodium hydroxide was introduced into the reaction vessel 1 from the chemical injection tank 3, and the temperature was increased by the heating medium boiler 5. Then, 30 kg of unsaturated polyester button shavings were introduced into the reaction vessel 1 from the tank 4.

After the temperature was raised up to 230° C., treatment was made for 10 hours. After reaction, the heating medium boiler 5 was switched to cooling for cooling the reaction vessel 1 to 150° C., and thereafter the valve 11 provided on the lower portion of the reaction vessel 1 was opened to remove undegraded materials by the centrifugal separator 12. A degradation liquid of 73.95 kg was obtained, with a degradation rate of 79.83%.

The molecular weight of the degradation product was measured through GPC similarly to Example 1. In result, number-average molecular weight and (weight-average molecular weight)/(number-average molecular weight) were 2,084 and 1.14 respectively at a peak 1 of the degradation product. At a peak 2 of the degradation product, number-average molecular weight and (weight-average molecular weight)/(number-average molecular weight) were 300 and 1.02 respectively. At a peak 3 of the degradation product, number-average molecular weight and (weight-average molecular weight)/(number-average molecular weight) were 155 and 1.02 respectively. At the total peak of the degradation product, number-average molecular weight and (weight-average molecular weight)/(number-average molecular weight) were 333 and 2.93 respectively.

(EXAMPLE 28) Degradation with Triethylene Glycol in Apparatus of Stainless 50 kg of triethylene glycol was introduced into the stainless 100L reaction vessel 1 from the chemical injection tank 2, and cooling water was fed to drive the cooler 7 while the stirrer 6 was rotated to start stirring at 24 rpm.

Then, 800 g of sodium hydroxide was introduced into the reaction vessel 1 from the chemical injection tank 3, and the temperature was increased by the heating medium boiler 5. Then, 29 kg of unsaturated polyester button shavings were introduced into the reaction vessel 1 from the tank 4.

After the temperature was raised up to 250° C., treatment was made for 5 hours. After reaction, the heating medium boiler 5 was switched to cooling for cooling the reaction vessel 1 to 150° C., and thereafter the valve 11 provided on the lower portion of the reaction vessel 1 was opened to remove undegraded materials by the centrifugal separator 12. A degradation liquid of 72.6 kg was obtained, with a degradation rate of 77.93%.

The molecular weight of the degradation product was measured through GPC similarly to Example 1. In result, number-average molecular weight and (weight-average molecular weight)/(number-average molecular weight) were 2,744 and 1.16 respectively at a peak 1 of the degradation product. At a peak 2 of the degradation product, number-average molecular weight and (weight-average molecular weight)/(number-average molecular weight) were 893 and 1.05 respectively. At a peak 3 of the degradation product, number-average molecular weight and (weight-average molecular weight)/(number-average molecular weight) were 462 and 1.03 respectively. At the total peak of the degradation product, number-average molecular weight and (weight-average molecular weight)/(number-average molecular weight) were 586 and 1.53 respectively.

(EXAMPLE 29) Re-Synthesis of Unsaturated Polyester Resin 40 kg of the ethylene glycol degradation product obtained in Example 26 (ethylene glycol equivalent: 10.75 mol/kg, analyzed by phthalation in Bunseki Kagaku Binran, edited by The Japan Society for Analytical Chemistry, p. 316 (1971), by Maruzen Co., Ltd.) was introduced into the reaction vessel 1 from the chemical injection tank 13, and neutralized with hydrochloric acid. Then, 16.9 kg of maleic anhydride was injected into the reaction vessel 1 from the chemical injection tank 14, and 38.2 kg of phthalic anhydride was added from the chemical injection tank 15. Nitrogen gas was fed at 60 L/h. from the nitrogen inlet tube 18, and stirring was made by the stirrer at 84 rpm while resulting water was distilled away by heating, and reaction was made at 210° C. for 4 hours.

Thereafter the reaction vessel 1 was cooled to 80° C., and 13.6 g of hydroquinone and 37.4 kg of styrene were added from the chemical injection tank 16. Thus, recycled unsaturated polyester resin of 124.8 kg was obtained. This recycled resin was stored in the tank 19.

The molecular weight of the resin as obtained was measured through GPC similarly to Example 1. In result, number-average molecular weight and (weight-average molecular weight)/(number-average molecular weight) were 1,274 and 1.62 respectively. For reference, it is pointed out that "Polylite 210M" by Dainippon Ink and Chemicals, Inc. has number-average molecular weight and (weight-average molecular weight)/(number-average molecular weight) of 1,646 and 3.26 respectively.

(EXAMPLE 30) Re-Synthesis of Unsaturated Polyester Resin 60 kg of the triethylene glycol degradation product obtained in Example 28 (ethylene glycol equivalent: 2.25 mol/kg, analyzed by phthalation in Bunseki Kagaku Binran, edited by The Japan Society for Analytical Chemistry, p. 316 (1971), by Maruzen Co., Ltd.) was introduced into the reaction vessel 1 from the chemical injection tank 13, and neutralized with acetic acid. Then, 13.24 kg of maleic anhydride was injected into the reaction vessel 1 from the chemical injection tank 14. Nitrogen gas was fed at 60 L/h. from the nitrogen inlet tube 18, and stirring was made by the stirrer 6 at 84 rpm while resulting water was distilled away by heating, and reaction was made at 200° C. for 3 hours.

Thereafter the reaction vessel 1 was cooled to 80° C., and 10.10 g of hydroquinone and 30.35 kg of styrene were added from the chemical injection tank 16. Thus, recycled unsaturated polyester resin of 101.2 kg was obtained. This recycled resin was stored in the tank 19.

The molecular weight of the resin as obtained was measured through GPC similarly to Example 1. In result, number-average molecular weight and (weight-average molecular weight)/(number-average molecular weight) were 906 and 1.61 respectively. For reference, it is pointed out that "Polylite 210M" by Dainippon Ink and Chemicals, Inc. has number-average molecular weight and (weight-average molecular weight)/(number-average molecular weight) of 1,646 and 3.26 respectively.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. Apparatus for recycling unsaturated polyester resin waste, which comprises a stainless steel reaction vessel equipped with:

a) a stirrer;
   b) separate injection means attached to sources of a glycol, a catalyst and the unsaturated polyester resin waste;
   c) an inlet tube for introducing a gas into the reaction vessel;
   d) heating and cooling means for heating and cooling the reaction vessel;
   e) a condenser for liquefying volatile components exiting from the reaction vessel;
   f) a trap between the reaction vessel and the condenser for removing sublimed solids existing from the reaction vessel;
   g) separate injection means attached to sources of reactants to be added to the reaction vessel;
   h) an outlet port for removing liquid from the reaction vessel;
   i) a centrifuge connected with the outlet port for separating solids from the liquid being removed from the reaction vessel; and
   j) means for returning the liquid from which the solids have been removed to the reaction vessel.

* * * * *